(12) United States Patent
Wood

(10) Patent No.: US 6,390,406 B1
(45) Date of Patent: May 21, 2002

(54) METHOD AND APPARATUS OF PRODUCING BELTS WITH PRECISE CORD LENGTH AND TENSION

(75) Inventor: Douglas Bruce Wood, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/854,716

(22) Filed: Jul. 25, 1997

Related U.S. Application Data

(63) Continuation of application No. 08/573,342, filed on Dec. 15, 1995, now abandoned.

(51) Int. Cl.$^7$ .............................................. B21C 47/14
(52) U.S. Cl. ..................... 242/443; 242/418; 242/419; 242/529
(58) Field of Search .............................. 242/529, 418, 242/419, 443, 410

(56) References Cited

U.S. PATENT DOCUMENTS

| | | | | |
|---|---|---|---|---|
| 3,227,383 A | * | 1/1966 | Zywietz | 242/443 |
| 3,371,879 A | * | 3/1968 | Hill | 242/418 |
| 3,379,385 A | * | 4/1968 | Osweiler | 242/418 |
| 4,415,397 A | | 11/1983 | Wetzel | 156/446 |
| 4,650,133 A | * | 3/1987 | White et al. | 242/419 |

OTHER PUBLICATIONS

Patent Abstracts of Japan, publication No. 63 030234, Aug. 1988.

* cited by examiner

*Primary Examiner*—Katherine A. Matecki
(74) *Attorney, Agent, or Firm*—Roger D. Emerson; John M. Skeriotis

(57) ABSTRACT

A method and apparatus for accurately applying a cord to a rotatable mandrel utilizes control of cord length, rather than cord tension, as the control parameter. The apparatus includes a mandrel with an inflatable diaphragm mounted on an outer surface of the mandrel. The diaphragm is selectively inflatable via a control valve and source of pressurized fluid for dynamically adjusting a circumference of the mandrel in response to a control input. The control input reads a tension in the cord being wound. The cord is positively fed to the mandrel according to a defined algorithm based on the mandrel's shape, circumference and rotational speed, rather than by demand feed of the cord. The apparatus includes a positive feed control capstan which is electronically geared. The apparatus further includes a cord-laying wheel which isolates radially directed forces from circumferentially-directed forces. A second embodiment of the invention includes the belt being rotated on first and second pulleys while the cord is applied. A center distance between the first and second pulleys is selectively adjustable to control cord tension in the cord.

17 Claims, 2 Drawing Sheets

METHOD AND APPARATUS OF PRODUCING BELTS WITH PRECISE CORD LENGTH AND TENSION

This application is a continuation of application Ser. No. 08/573,342 filed Dec. 15, 1995 now abandoned.

BACKGROUND OF THE INVENTION

This invention pertains generally to the art of apparatus and methods for applying cords to a rotating structure, and more specifically to apparatus and method for producing elastomeric belts with precise cord length and cord tension.

Traditional methods of applying cords to a rotating mandrel involved a cylindrical mandrel of minimal compliance, meaning the dimensions of the mandrel, especially the diameter and circumference, are essentially constant. The mandrel may be a rigid cylinder, in which case the cord length is controlled by selecting a cylindrical mandrel with the correct circumference. Other mandrels are not cylinders, and the invention disclosed herein applies to such mandrels as well.

In some prior art mandrels, the mandrel circumference is adjusted by applying or removing layers of material from its surface. Other mandrels have radially telescoping elements which form a series of arcs approximating a circle. In all of these, the cord is applied using a guide wheel which controls the cord tension as accurately as practical in a demand feed mode. The length of cord per revolution of the mandrel is dependent on the cylinder circumference and, therefore, on the manufacturing tolerances of the cylinder.

Mandrels are often used in the construction of elastomeric belt products, such as timing or drive belts for automotive applications. Most belt designs also require layers of other belt materials be wound onto the cylinder before the cord. The thickness, hardness, and temperature tolerances of these materials may also affect cord length.

The present invention controls cord length independently of the tolerances of the cylinder or the underlying layers. Furthermore, the present invention is capable of controlling cord length in a highly accurate manner, with accuracies to 30 parts per million possible. This is of particular importance in making toothed timing belts where a cord length error will result in improper meshing of teeth and premature tooth or belt failure.

Another advantage of the present invention is that the helical cord structure made by the present invention can be removed easily from the cylinder without loss of length accuracy or distortion of the helix dimensions. This allows the belt containing the cord to be formed by internal pressure in an external mold like a tire mold, or in a press, rotocure, or sectional cure device. The belt is easily removable due to the collapsibility of the mandrel. Allowing the mandrel to collapse releases tension in the cord and provides enough clearance for easy removal of the belt from the mandrel.

Timing belts are traditionally made on cylindrical molds having tooth forms on the outer surface which are parallel to the cylinder axis. A layer of fabric, rubber, plastic, or other flexible material is placed over the cylinder. The cord is wound over the outside of the assembly. Additional materials may be placed over the cord. The belt is formed by applying inwardly radial pressure from a diaphragm during the curing process. The finished product is removed by sliding it axially to disengage the mold teeth from the belt teeth. This process can work for belts with axial teeth or belts with a single set of helical teeth, but it cannot work for an interrupted tooth such as a herringbone, dual helical, or zigzag tooth because belts with these forms of teeth cannot slide axially off the mandrel.

The present invention allows these products to be made with an external rather than an internal mold, while still retaining cord length accuracy. It also allows these products to be made with flat sectional molds while retaining cord length accuracy. Both of these methods allow the belt teeth to be disengaged from the mold by motion approximately perpendicular to the mold surface. This allows the interrupted tooth forms to be removed from the mold.

The present invention contemplates a new and improved method of producing belts with precise cord length and tension which is simple in design, effective in use, and overcomes the foregoing difficulties and others while providing better and more advantageous overall results.

SUMMARY OF THE INVENTION

In accordance with the present invention, a new and improved method of producing belts with precise cord length and tension is provided.

The invention is a method and apparatus for applying accurate lengths of cord to a rotating mandrel by using a geared feed capstan. The geared feed capstan measures and meters out a selected length of cord for each revolution of the mandrel. All real materials suitable for winding, including cords or wires, are elastic or stretchable, so that an accurate description of the length of the cord to be applied must also specify the tension in the cord when its length is measured. The feed capstan measurement and metering accuracy is affected by the tension of the cord entering and exiting the feed capstan. This necessitates measuring and controlling the cord tension. The exiting tension is controlled by the expansion of the mandrel. The entering tension is held constant by a tension control capstan, but any other means that maintains accurate entering tension is also suitable. In the disclosure, the exiting cord tension control is achieved by the expanding mandrel and the tension sensing load cells which in part control the expansion. The concept of primarily controlling cord length and secondarily controlling cord tension is a key element of the invention.

For example, other cord winding machines use cord tension as the control parameter. As the mandrel rotates, the length of cord is determined by the mandrel circumference, a procedure called "demand feed" for the purposes of this disclosure. The length of the cord is dependent on the mandrel circumference and the tolerances of that circumference. There is no means of accurately determining the length of cord so applied.

The function of the apparatus disclosed herein may be inverted (so that the cord length is secondarily controlled and cord tension is primarily controlled) and the apparatus will still provide improvements and benefits over the prior art. The load cells which control the expansion of the flexible diaphragm can instead be used to control cord tension directly, and the feed capstan can be used as an accurate length measuring device rather than as a measuring and metering device. The length measured at the feed capstan can then be used to control the mandrel inflation to obtain the desired metered length of cord.

In accordance with the present invention, there is disclosed an apparatus for applying a cord to a rotating structure, the apparatus including a capstan for regulating the length of the cord; supplying means for supplying the cord to the capstan; holding means for holding and rotating the rotating structure; and applying means for applying the cord from the capstan to the rotating structure on the holding means.

According to another aspect of the present invention, the apparatus for applying a cord to a rotating structure further includes a first capstan between the supplying means and the applying means; and, a second capstan between the first capstan and the applying means.

According to another aspect of the present invention, the applying means includes a laying wheel and, a second tension sensor, the second tension sensor being located between the laying wheel and the second capstan.

According to another aspect of the present invention, a method for applying a cord to a rotating structure is provided. The method includes the steps of supplying the cord to a capstan via supplying means; positioning the cord around the capstan, thereby applying tension to the cord; feeding the cord to an applying means; and, applying the cord around the rotating structure, the rotating structure being connected to a mandrel means. The rotating structure is expandable.

According to another aspect of the invention, the method further includes the cord being positively fed to the mandrel according to a defined algorithm where said algorithm is based on a shape, circumference and rotational speed of said mandrel.

According to one aspect of the invention, an apparatus for accurately applying a cord to a rotatable mandrel includes means for dynamically adjusting the circumference of the mandrel in response to a control input. The means for adjusting is an inflatable diaphragm mounted on an outer surface of the mandrel.

According to another aspect of the invention, the apparatus further includes control means which includes a control valve capable of dynamically adjusting the mandrel circumference by selectively inflating or deflating the diaphragm in response to feedback control input of a measured cord tension.

According to another aspect of the invention, the apparatus includes control means which includes a control valve and tension control means wherein the tension control means is an electronically geared tension control capstan.

According to another aspect of the invention a cord-laying means for laying the cord on said mandrel includes a cord-laying wheel which isolates radially directed forces from said mandrel.

According to another aspect of the invention the belt can be corded on first and second pulleys. The first and second pulleys being spaced a center distance apart, and the center distance being selectively adjustable to control cord tension in the cord. The center distance between the first and second pulleys is dynamically adjustable to control cord tension in the cord during said positive-feeding of the cord onto the mandrel.

According to another aspect of the invention a position-determining means, namely an encoder, is operatively associated with the motor and shaft which rotates the mandrel.

According to another aspect of the invention, a method of accurately applying a cord to a rotatable mandrel is provided. The comprising the steps of rotating a mandrel, the mandrel having means for dynamically adjusting a circumference of the mandrel in response to a control input, the means being an inflatable diaphragm mounted on an outer surface of said mandrel, and sending the control input to the means to adjust the circumference of said mandrel in order to maintain a desired cord tension.

According to another aspect of the invention, a method of accurately applying a cord to a rotatable mandrel is provided. The comprising the steps of rotating a mandrel, feeding cord to said mandrel, laying the cord on said mandrel, and, isolating radially directed forces from circumferentially-directed forces.

One advantage of the present invention is its ability to apply a cord at a known length and tension to a rotating structure according to a defined algorithm, such application being made independently of the shape, size, and speed of the rotating structure.

Another advantage of the present invention is its use of an accurate feed capstan in conjunction with a means of accurately controlling tension into and out of the capstan.

Another advantage of the present invention is the use of a tension capstan to control the tension of a cord into the feed capstan.

Another advantage of the present invention is its control of the tension from the feed capstan to the rotating structure by making the rotating structure radially compliant to the cord being wound.

Another advantage of the present invention is its ability to dynamically adjust the radius of the mandrel as it rotates using measured tension feedback to adjust the radius to achieve desired cord tension.

Another advantage of the present invention is the use of a rigid cord laying wheel to accurately control the cord position on the mandrel and to separate the radial forces that arise from laying the cord from the desired forces which result from the tension in the cord.

Another advantage of the present invention is the use of timing belt or chains to positively feed a cord onto a belt slab which is rotating on two or more pulleys.

Another advantage of the present invention is its ability to adjust the center-to-center distance between pulleys to control cord tension during positive feeding of the cord.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DETAILED DESCRIPTION OF THE INVENTION

Figure 1:
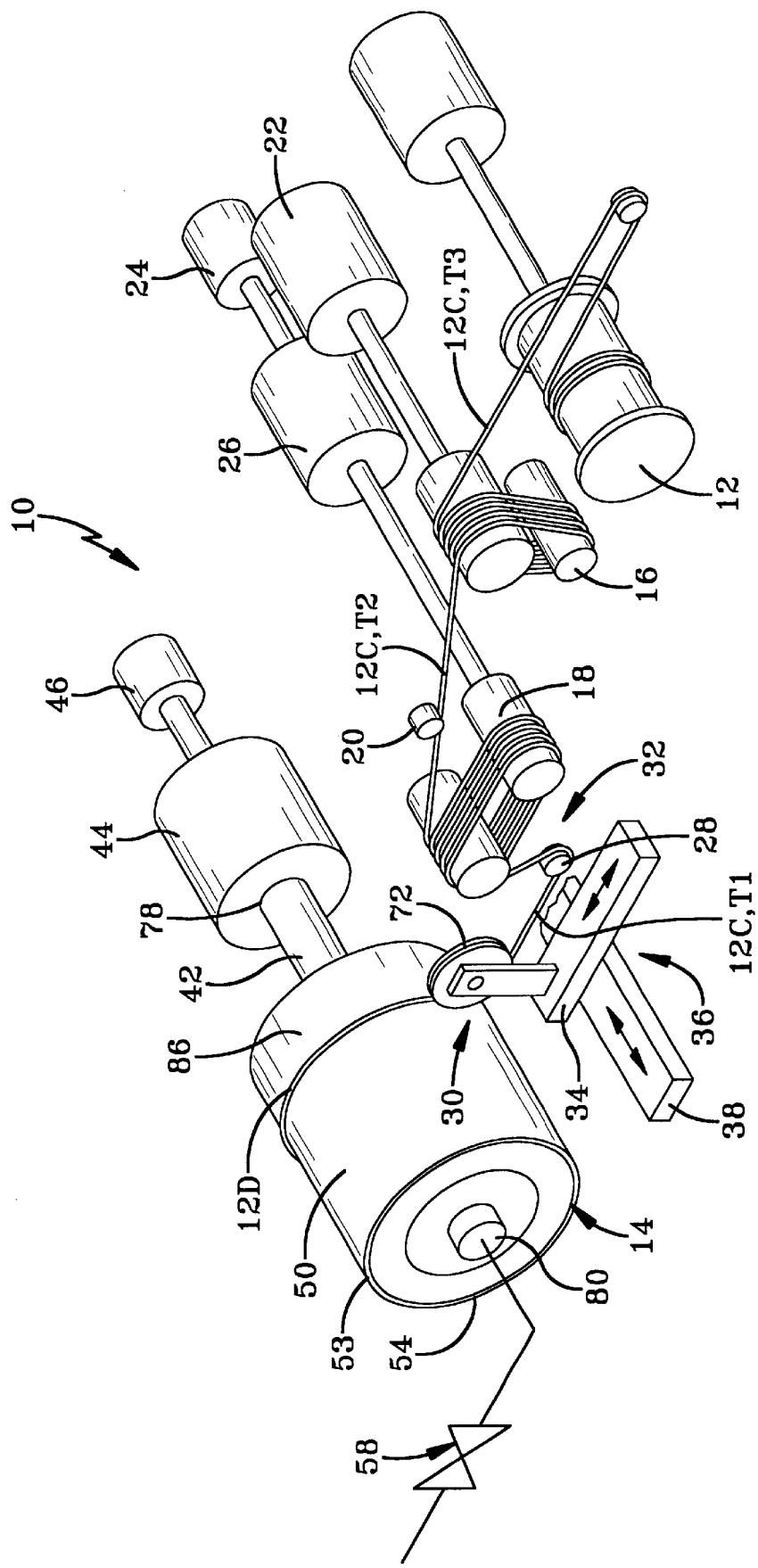
FIG. 1 is a perspective view of an apparatus according to the invention used to produce belts with precise cord length; and, FIG. 2 is a perspective view of a further embodiment of the present invention featuring two pulleys rather than a single mandrel.

Referring now to the drawings, which are for purposes of illustrating a preferred embodiment of the invention only, and not for purposes of limiting the invention, FIG. 1 shows a perspective view of an apparatus 10 for applying cords 12 to a rotating mandrel 14. The mandrel 14 illustrated is cylindrical but the herein disclosed methods and apparatus are equally applicable to noncylindrical mandrels and such applications are equally within the claimed subject matter.

The invention is conveniently disclosed with reference to three areas or spans associated with the inventive apparatus where the cord 12 is under tension. In a first span 12C the cord 12 is under a tension T1. The first span 12C is the path of the cord 12 from a feed capstan 18 to a mandrel 14. In a second span 12B the cord 12 is under a tension T2. The second span 12B is the path of the cord 12 from an electronically-geared tension capstan 16 to an inlet of the feed capstan 18. In a third span 12A the cord 12 is under a tension T3. The third span 12A is the path of the cord 12 from the tension capstan 16 to the supply source of the cord 12.

Tension capstan 16 is a demand feed, tension control device which changes tension in the cord 12 from a tension T3 in the first section of the cord path 12A to tension T2 in the second section of the path 12B. This change in cord tension occurs while the apparatus 10 is operating at a variable cord speed in a second section 12B of the cord path. The variable cord speed is determined by the speed required for the cord 12 to enter a feed capstan 18. The cord tension in the second path section 12B is measured by a tension sensor 20 of conventional design. Any tension sensor 20 chosen with sound engineering judgment for the particular application in question will suffice. The tension sensor 20 controls the speed of the tension capstan 16 relative to the speed of the feed capstan 18 to compensate for any change in the length of the second path section 12B and to maintain the tension T2 in the second path section 12B at a desired level.

The tension capstan 16 is preferably of a conventional design, meaning it depends on the coefficient of friction and the arc of contact between the tension capstan 16 and the cord 12. The tension capstan 16 further depends on T3 and T2 both being greater than zero to create a difference between T3 and T2 which is relatively independent of variations in T3 and where T2 can be greater than or less than T3. The allowable tension T3 is determined by the characteristics of the cord 12 and cord package design for the belt in question. The allowable tension T3 can vary from a few grams to several hundred pounds by scaling the size of several components described.

The control system for the motor 22 which turns the tension capstan 16 can use feedback from the tension sensor 20 and positional and rotational data from a feed capstan encoder 24 to accurately control tension T2.

The feed capstan 18 preferably can accommodate one, two, or more cords 12 entering the feed capstan 18 from one or more similar cord paths 12B containing the features described. The feed capstan 18 is preferably of a conventional design and is similar to tension capstan 16 in that it depends on a coefficient of friction and arc of contact between the cord 12 and the feed capstan 18 and further depends on T2 and T1 both being greater than zero to propel a cord 12 from the second portion of the path 12B to the third portion of the path 12C. The ratio T1/T2 can typically range from 0.05 to 20, and preferably is 0.5 or 2.0, during operation of the apparatus.

The feed capstan 18 preferably has a cylindrical outer surface of an accurately known circumference on which the cord 12 rests when in contact with the feed capstan 18. The feed capstan 18 is connected to a servomotor 26 which can apply clockwise or counterclockwise torque to the feed capstan 18. The torque so supplied is of sufficient magnitude to cause the feed capstan 18 and the cord 12 to move a desired feed distance along the path 12B, 12C relatively independent of tension T2 and T1.

The feed capstan 18 is electronically geared so that the length of cord 12, rather than its tension, can be controlled. In other words, the feed capstan 18 "positively feeds" the cord 12 in regards to its length, rather than "demand feeds" the cord 12 in regards to tension in the cord 12. The expanding mandrel 54 controls the tension in the cord 12.

An alternate method of accurately winding cord 12 onto a rotating surface might be used if the cord 12 has a well-defined and highly uniform modulus of elasticity. In such case, the algorithm used to electronically gear the feed capstan 18 to the mandrel rotation can include consideration of both the desired length at some specified tension, and the actual tension sensed by the load cells in the third cord span (tension T1). The algorithm can adjust the actual length applied at the actual tension T1 to correspond according to the cord elastic modulus to the desired length at the desired cording tension. This method depends on the mandrel having an elastic compliance similar to the elastic modulus of the cord and is applicable over a very small range of adjustment. This method may eliminate the need for an expanding mandrel. However, the algorithm is much more difficult to implement and the actual modulus of the cord can vary over time, making this method less desirable than the preferred method described herein.

The feed capstan 18 is connected to an encoder 24 which accurately detects the position and rotation of the feed capstan 18, and thereby accurately measures the movement of the cord 12 from the second path section 12B into the third path section 12C.

The third cord path section 12C extends from the feed capstan 18 to the mandrel 14 onto which the cord 12 is to be wound. Contained within cord path section 12C is a tension measuring device 28 for each cord 12 passing through section 12C, and at least one cord laying wheel 30. The cord laying wheel 30 contains circumferential grooves 72. Each circumferential groove 72 can guide one or more cords 12 onto the circumference of the mandrel 14.

The cord laying wheel 30, tension measuring device 28, and feed capstan 18 are mounted rigidly with respect to one another to form an assembly 32 to maintain a constant length in the third cord path section 12C. The assembly 32 is mounted on a radial positioning system 34 to form a radial assembly 36 which can accurately bring the perimeter of the cord laying wheel 30 to a desired radial distance from the center of rotation of the mandrel 14. The radial positioning system 34 includes linear bearings or slides mounted on an axial positioning system 38. The linear bearings have only one degree of freedom, which is linear motion in the direction perpendicular to the axis of rotation of the mandrel 14.

The radial assembly 36 is mounted on the axial positioning system 38 which can move the radial assembly 36 parallel to the axis of rotation of the mandrel 14. The axial positioning system 38 includes a linear bearing or slide which supports the radial positioning system 34. The linear bearings of the axial positioning system 38 have only one degree of freedom, which is linear motion in the direction parallel to the axis of rotation of the mandrel 14. The axial positioning system 38 is strong, stiff and rigid enough to prevent linear motion in any undesired direction or rotation of the radial positioning system 34 about any axis.

The combined motion of the radial and axial positioning systems 34, 38 defines a plane containing the axis of rotation of the mandrel 14 and the centerline of the cord laying wheel 30. This configuration allows for easy control of the radius at which the cord is laid on the mandrel 14. These systems can be made to the degree of accuracy presently existing in the known art of winding cord at a controlled tension in a demand-feed mode. The accuracy and stiffness of the axial and radial positioning systems 34, 38 is critical to enable the cord-laying device to separate radial and circumferential forces.

The mandrel 14 is rigidly coupled to and rotates with a mandrel support shaft 42 which has a first end 78 connected to a drive motor 44, so that the drive motor 44 rotates the shaft 42 and mandrel 14. A second end 80 of the shaft 42 is attached to the mandrel 14. The shaft 42 is also connected to a position-determining means accurately determining the position of said mandrel. In the preferred embodiment, the position-determining means is an encoder 46 which accurately measures the position and rotation of the shaft 42 and mandrel 14.

The shaft 42, radial positioning system 34, and axial positioning system 38 are connected for coordinated motion in a conventional manner, particularly similar to a computer numerically controlled (CNC) machine tool with the shaft 42 representing a typical rotary "C" axis. Such a system allows the shaft 42 and axial support 38 to move concurrently in a way that cause the cord laying wheel 30 to move in a helical or any other specified path along the outer cylindrical surface of the mandrel 14.

If the radial positioning system 34 is also controlled to move concurrently with the shaft 42 and the axial positioning system 38, the cord laying wheel 30 can move along any definable path on a three dimensional surface of revolution which is rotating about the shaft 42. The three dimensional shape could be a familiar filament wound object, such as a torus, a tire, a convoluted air spring, a cylindrical air spring with helical or variable angle winding, a bead setting bladder, tire curing bladder, a pressure vessel, or a missile casing.

The rotation of the mandrel 14 is measured by an encoder 46 attached to the mandrel support shaft 42. The rotation of the feed capstan 18 is measured by an encoder 24. The control system (not shown) must control the rotation speed and angular acceleration of either the mandrel 14 or the feed capstan 18, and must contain an algorithm defining the desired relative motion of the mandrel 14 and the feed capstan 18. For example, in the case of a cord 12 wound at constant helical pitch on a cylindrical mandrel 14, the relative motion is a constant gear ratio matching the speed of the cord 12 on the feed capstan 18 to the theoretical surface speed required to create path 12D at the proper tension T1 on the mandrel 14.

Although mechanical means can be used to control the relative motion of the feed capstan 18 and the mandrel 14, a much more flexible and cost effective system is achieved when electronic controls are used. The encoders 24, 46 can detect errors in the relative motion or speed of the feed capstan 18 and the mandrel 14. Conventional motor speed control systems can be used to maintain the correct relative speeds of the motors 26, 44, but controlling the relative speeds can result in the accumulation of small speed errors which result in increasingly large positional errors. The preferred control system is electronic and uses the encoders 24, 46 to measure the relative position of the mandrel 14 and the feed capstan 18, and thereby detect errors in their relative position. The preferred control system adjusts the speed of either motor 26 or motor 44, creating an intentional small velocity error which returns the positional error near zero and prevents the accumulation of small positional errors which would result in an unacceptable large positional error.

The mandrel 14 has an outer surface 86 onto which the cord 12 is wound along cord path 12D. Layers of other belt materials 50 may be placed on the mandrel 14 prior to winding of the cord 12. These layers 50 may include discrete components, sheet material, or previously applied wound cord. The circumference of the mandrel 14 and these underlying layers 50 must be at least large enough to maintain the minimum required tension T1 in cord path section 12C, and must be no larger than circumference required to maintain the maximum allowed tension in path 12C. If the mandrel 14 and the underlying layers 50 have sufficiently accurate dimensions, or have compressibility or compliance which keep tension T1 within an acceptable tolerance range, the mandrel 14 can be of a conventional design.

To obtain greater precision in the control of tension T1, the mandrel 14 may contain circumference means for dynamically adjusting the circumference of the mandrel 14. In the preferred embodiment the circumference means is a layer 53 with an adjustable radius. The preferred construction of this layer 53 consists of a flexible diaphragm 54 attached to the rigid structures of the mandrel 14, forming a fluid tight cavity between the mandrel 14 and the diaphragm 54. Fluid is introduced to the diaphragm 54 by a control means for controlling the circumference of the mandrel 14. In the preferred embodiment the control means is a control valve 58 which enables the diaphragm 54 to expand radially, thereby adjusting the radius or circumference of the underlying layers 50 of the in-process belt to the size required to achieve the desired tension T1. Tension capstan 16 controls the tension into the feed capstan 18, while the tension out of the feed capstan 18 is controlled by the expanding diaphragm 54. The tension sensor 28 in cord path 12C can be used as a feedback element to the control system which uses the valve 58 to adjust the amount of fluid in the cavity between mandrel 14 and the diaphragm 54.

A further improvement in the control of tension T1 is achieved by positioning the cord laying wheel 30 at the exact required cord laying radius so that radial forces associated with laying cord are supported by the cord laying wheel 30, the positioning systems 34, 38, and the frame of the machine. This allows tension T1 to depend only on circumferential forces.

The above-described mandrel 14 and diaphragm 54 provide for a very small adjustment in the length of the timing belts made on the mandrel 14. Mandrels 14 with different radii can be attached to the mandrel support shaft 42 to make timing belts with a wide range of timing belt length or circumference. The mandrel 14 must have a large diameter and weight to make a long timing belt.

Figure 2:
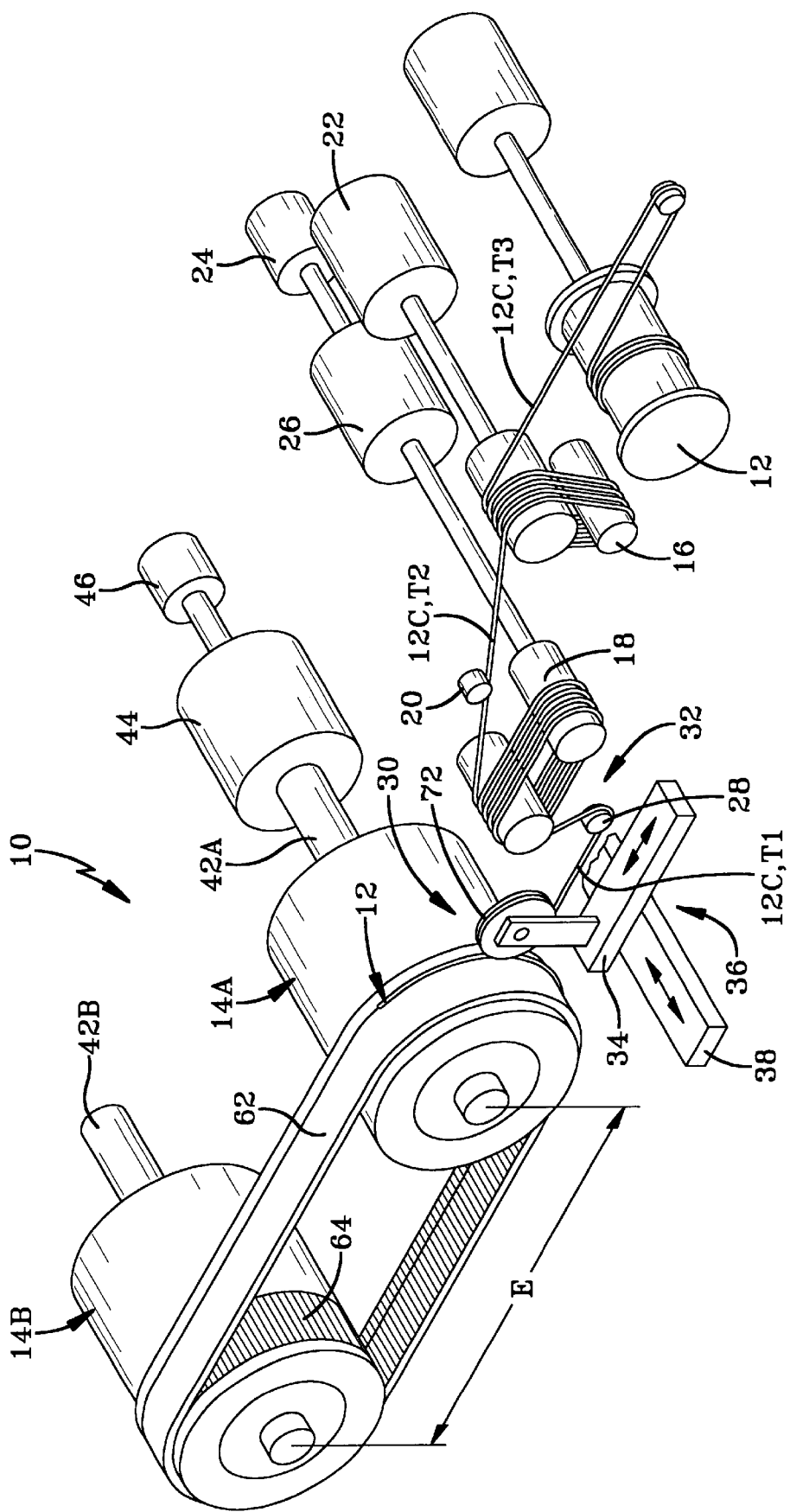

With reference to FIG. 2, an alternate embodiment of the invention is disclosed. It is often desirable to make belts of various length, some being long belts, without having a large inventory of mandrels 14. FIG. 2 shows a machine having two parallel shafts 42A and 42B supporting pulleys or sprockets 14A and 14B which are placed at a specified center-to-center distance E to make timing belts of varying lengths. The timing belt is built around the pulleys 14A,14B with the belt length being determined by the circumference of a pulley 14A,14B plus two times the center-to-center distance E between the pulleys 14A,14B.

The positive feed system described previously can be applied to such a building machine only if the belt motion can be accurately measured. Since the underlying belt structures are no longer attached to the mandrel (see FIG. 1), this position cannot be measured by detecting position of the pulley 14A,14B or shaft 42A,42B rotation. A leader chain or timing belt 62 running in sprockets 64 on the pulleys 14A,14B can be used to guide the end of the cord 12 around the pulleys 14A,14B at a known position. The tension T1 is adjusted by either changing the center-to-center distance E of the pulleys 14A,14B, or by making one of the pulleys 14A or 14B with an expandable diaphragm 54 (see FIG. 1) as described above.

In the case of an expandable diaphragm 54, the control system as described above, of course, would also be used. The lead belt or chain 62 must change in length as the center-to-center distance E is adjusted. This can be achieved with proper selection of the belt elastic modulus or by using a tooth pressure angle which allows the belt or chain 62 to change effective radius on the sprockets 64. (The "tooth pressure angle" for a belt or chain is the angle between a radial line of the sprocket passing from the center of the sprocket through the tooth contact point, and a normal line at the tooth contact point. If these lines are perpendicular, the pressure angle is zero, and the forces between the belt and sprocket are only tangential. The belt can transmit torque without a radial component to the normal forces. When the pressure angle is greater than zero, the normal force between the belt and sprocket contains a radial component which can push the belt radially outwardly. This outward motion allows the belt to operate at a constant circumferential length even when the center-to-center distance of the sprocket is varied by a small amount.) The control system would use feedback from the tension measuring device 28 to control the expanding diaphragm, and therefore, cord tension. If the cord tension is to be controlled by varying the center-to-center distance E, the tension measuring device 28 would provide feedback to the center-to-center adjusting mechanism and therefore control cord tension.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. An apparatus for applying a section of cord having a predetermined length from a cord source to a rotatable mandrel comprising:

a rotatable mandrel;

a feed capstan for positively feeding said cord to said rotatable mandrel, said cord having an entering tension entering said feed capstan and an exiting tension exiting said feed capstan;

a laying wheel being disposed between said feed capstan and said rotatable mandrel for positioning said cord on said rotatable mandrel in a predetermined pattern;

first tension measuring means for measuring said exiting tensions said first tension, measuring means contacting said cord between said feed capstan and said laying wheel;

first measuring means for measuring a length of cord exiting said feed capstan; and, adjusting means for dynamically adjusting a circumference of said mandrel to maintain a predetermined cord tension in the cord between said feed capstan and said laying wheel.

2. The apparatus of claim 1 wherein said adjusting means is an inflatable diaphragm mounted on an outer surface of said mandrel.

3. The apparatus of claim 2 wherein said adjusting means comprises:

a pressurized fluid source; and, a control valve, said control valve being operable to control a flow of fluid into and out of said inflatable diaphragm.

4. The apparatus of claim 3 further comprising:

feedback means for providing feedback from said first tension measuring device to said control valve, said control valve responding to said feedback from said first tension measuring means.

5. The apparatus of claim 1 wherein said mandrel is non-cylindrical.

6. An apparatus for accurately applying a cord from a supply source to a rotatable mandrel, said apparatus comprising:

a mandrel, said mandrel being rotatable about an axis of rotation and having circumference means for dynamically adjusting a circumference of said mandrel;

a cord-laying assembly for laying the cord on said mandrel;

first tension measuring, means for measuring tension in the cord at a position between said supply source and said rotatable mandrel; and, feedback means for providing feedback from said first tension measuring device to said circumference means said circumference means being operable to adjust said circumference of said mandrel in response to said feedback.

7. The apparatus of claim 6 wherein said cord-laying means comprises:

a cord-laying wheel.

8. The apparatus of claim 6 wherein said apparatus further comprises:

a radial positioning system being moveable in a direction perpendicular to said axis of rotation of said mandrel, said cord laying assembly being mounted on said radial positioning system; and, an axial positioning system being moveable in a direction parallel to said axis of rotation, said radial positioning system being mounted on said axial positioning system.

9. An apparatus for accurately applying a section of a cord having predetermined length and tension from a supply source to a support device, said apparatus comprising:

first and second parallel shafts being rotatable about parallel axes of rotation, said shafts being separated by a predetermined center-to-center distance;

first and second pulleys respectively mounted on said first and second shafts;

a lead belt circumferentially engaged about said first and second pulleys and rotatable therewith;

a positive-feeding means for positively-feeding said predetermined length of said cord onto said first and second pulleys, said cord having an exiting tension exiting said positive-feeding means;

a first tension measuring device positioned between said positive-feeding means and said first and second pulleys being operable to measure said exiting tension; and, control means for controlling said exiting tension to maintain said predetermined tension.

10. The apparatus of claim 9 wherein said positive-feeding means further comprises:

a radial positioning system being moveable in a direction perpendicular to said axis of rotation of said mandrel, said positive-feeding means being mounted on said radial positioning system; and, an axial positioning system being moveable in a direction parallel to said axis of rotation, said radial positioning system being mounted on said axial positioning system.

11. The apparatus of claim 9 wherein said control means is operable to change said center-to-center distance between said first and second shafts.

12. A method of accurately applying a cord from a supply source to a rotatable mandrel, said method comprising the steps of:
- rotating a mandrel, said mandrel having circumference means for dynamically adjusting a circumference of said mandrel;
- measuring a tension in the cord at a first predetermined position spaced from said mandrel with a first tension measuring device;
- sending a control input from said first tension measuring device to said mandrel; and,
- adjusting the circumference of said mandrel in response to said control input in order to maintain a desired cord tension.

13. The method of claim 12 wherein said step of adjusting the circumference comprises inflating a diaphragm mounted on an outer surface of said mandrel.

14. A method of accurately applying a cord from a supply source to a rotatable mandrel, said method comprising the steps of:
- rotating a mandrel, said mandrel rotating on first and second pulleys being spaced a center-to-center distance apart;
- positively feeding a predetermined length of said cord to said mandrel by rotating a feed capstan; and,
- selectively adjusting said distance between said first and second pulleys to control cord tension in the cord.

15. The method of claim 14 wherein said
step of adjusting said distance dynamically controls tension in the cord during said positive-feeding of the cord onto said mandrel.

16. An apparatus for accurately applying a cord from a supply source to a rotatable mandrel, said apparatus comprising:
- a mandrel;
- a cord laying assembly for laying said cord on said mandrel;
- a radial positioning system for allowing radial movement of said cord laying assembly with respect to said mandrel;
- an axial positioning system for allowing axial movement of said cord laying assembly with respect to said mandrel; and,
- controlling means for coordinating movement of said radial positioning system and said axial positioning system.

17. A method of accurately applying a cord from a supply source to a rotatable mandrel, said method comprising the steps of:
- metering a predetermined length of cord from said supply source to said mandrel by use of a feed capstan;
- rotating said mandrel, said mandrel having circumference means for dynamically adjusting a circumference of said mandrel;
- measuring tension in the cord at a predetermined position between said feed capstan and said mandrel with first tension measuring means for measuring cord tension;
- sending a control input from said first tension measuring means to said circumference means; and,
- adjusting said circumference of said mandrel in order to maintain a desired cord tension.

* * * * *